United States Patent Office 3,738,826
Patented June 12, 1973

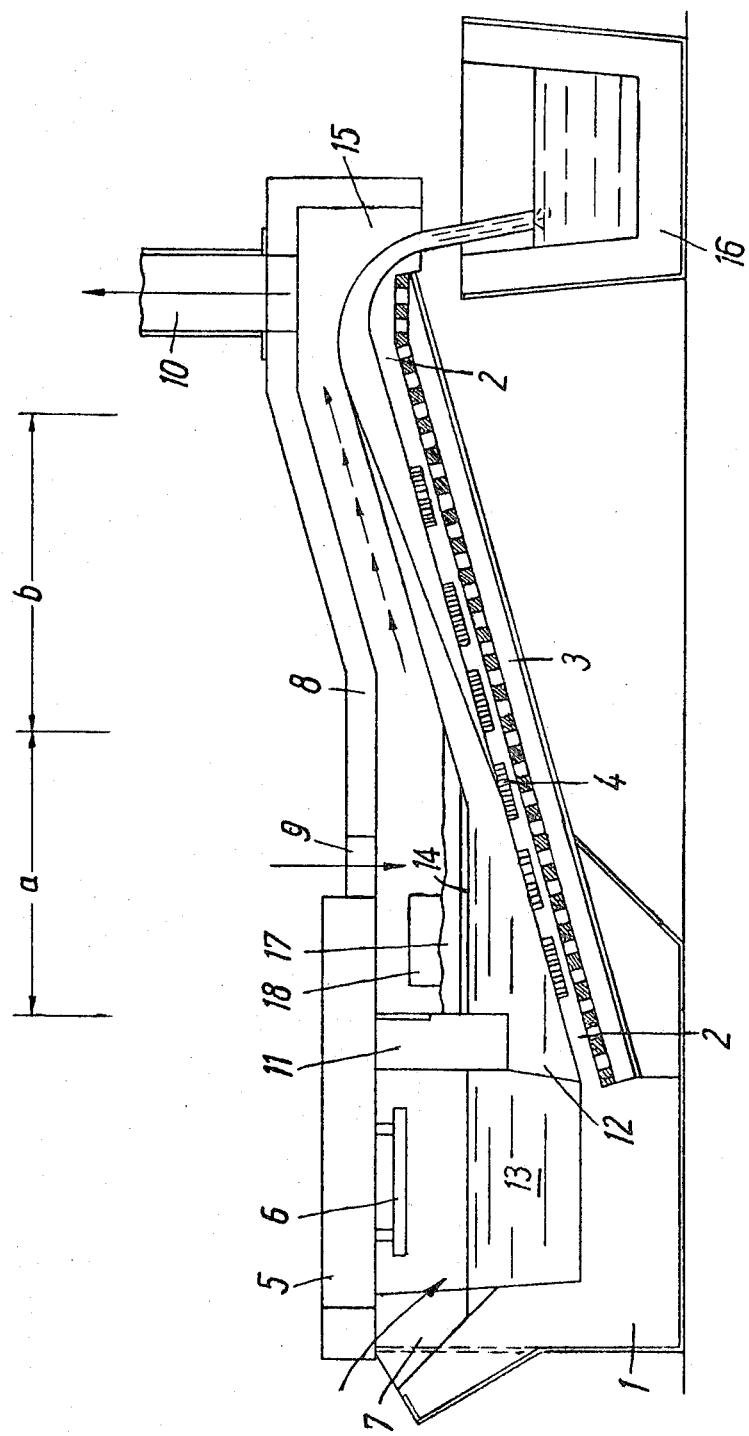

3,738,826
METHOD OF CONTINUOUSLY PRODUCING
BLISTER COPPER FROM COPPER MATTE
Axel von Starck, Remscheid, and Franz E. Pawlek, Berlin, Germany, assignors to AEG-Elotherm G.m.b.H., Remscheid-Hasten, Germany
Filed June 1, 1971, Ser. No. 148,348
Claims priority, application Germany, June 4, 1970,
P 20 27 452.6
Int. Cl. C22b 15/00
U.S. Cl. 75—75
2 Claims

ABSTRACT OF THE DISCLOSURE

A method of continuously producing blister copper from copper matte in which the matte is conveyed up an ascending refractory trough after introduction into a melting vessel, with siliceous material added in a first section of the trough and oxygen containing gas added in this first and a second following section so that the iron in the matte sulphide reacts with the oxygen in the second section to form copper which collects on the trough floor to be removed at the upper end of the trough.

---

For the production of copper from copper sulphide ores concentrates of the copper ores are usually smelted in a reverberatory furnace. Smelting and simultaneous roasting may also be carried out in a fluid bed roaster. Both methods lead to the production of a liquid mixture of copper sulphides and iron, referred to as matte. The liquid matte is usually taken to a converter wherein the iron is slagged, leaving pure copper sulphide which is blown to produce blister copper (raw copper). This copper which is still very impure is further purified by an oxidising fire-refining treatment followed by poling and then cast into anodes which can be further refined electrolytically.

In this conventional method of producing copper smelting to the matte in a reverberatory furnace or in a fluid bed roaster is a continuous process, whereas the following steps of the process are discontinuous, i.e. performed in separate charges.

It is the object of the present invention to provide a method of continuously producing blister copper from the copper matte.

The method according to the invention consists in introducing the matte into a melting or holding vessel, conveying the liquid matte from this melting or holding vessel by means of a travelling electromagetic field up an ascending refractory trough, adding in a first section of the trough adjoining the melting or holding vessel a highly siliceous material, such as sand, and in this and a following second section of the trough blowing into or on the medium conveyed up the trough an oxygen-containing gas to oxidise and slag the iron contained in the matte in the first section of the trough and to react the copper sulphide with the admitted oxygen in a roasting reaction to form copper which collects on the floor of the trough and which is removed from the upper end of the trough.

In order definitely to prevent the copper sulphide from leaving the upper end of the trough another advantageous feature of the proposed method comprises so adjusting the strength of the travelling field in the neighbourhood of the upper end of the trough that at this point it is too weak to convey the copper sulphide that floats on the copper surface.

The invention will be hereinafter more particularly described and reference made to the drawing.

In the drawing 1 is a schematic representation in section of the vessel 1 of a holding furnace. Adjoining this vessel 1 is the ascending refractory trough 2 of an electromagnetic launder. For the generation of a travelling electromagnetic field the stator winding 3 of a three-phase linear motor is located underneath the trough, the windings being fed from a controllably variable source of three-phase supply.

Distributed along its length the trough 2 contains several porous bottom bricks 4 which communicate with lateral gas inlet ducts not shown in the drawing. The holding vessel 1 which is equipped with heating means 6 under its cover 5, is formed at its end remote from the trough with a charging opening 7. The trough 2 is closed by a cover 8 which has an opening 9 at the end of the trough adjacent the holding vessel. Roughly where the liquid in the trough attains its highest level the cover 8 contains an outlet vent 10.

The space inside the holding vessel 1 is separated from the space defined by the trough by a wall 11 resembling an inverted weir in such a way that the holding vessel communicates with the trough only through an opening 12 in the wall 11 adjoining the lower end of the bottom of the trough.

The above-described equipment permits the method according to the invention to be performed as follows:

The liquid matte 13 from the reverberatory ore smelting furnace or the fluid bed roaster is filled into the holding vessel 1 through the charging opening 7 in sufficient quantity for the surface of the liquid to be above the opening 12 in the wall 11 and to extend into the trough 2. Through the opening 9 in the cover 8 a substance with a high silica content, such as sand, is introduced. In a first section $a$ of the trough adjoining the holding vessel 1 this material forms a layer 14 floating on the top of the copper matte. Moreover, an oxygen-containing gas, such as air, oxygen-enriched air or pure oxygen, is now blown into the trough through the porous bottom bricks 4 and the electromagnetic travelling field is started up. Under the effect of the travelling field the liquid electrically conducting copper matte is conveyed up the ascending trough 2.

In the above-mentioned first section $a$ of the trough the iron contained in the matte is oxidised and slagged, whereas the copper sulphide reacts in this and in the following section $b$ of the trough, which likewise contains porous bottom bricks, with the oxygen in the blowing gas to form copper in a roasting reaction. The resultant liquid copper collects on the floor of the trough, forming a layer which in depth increases in conveying direction along the length of the trough, whereas the thickness of the supernatant copper sulphide layer continuously diminishes. Owing to the greater field intensity near the floor of the trough and the higher electric conductivity of the copper the latter is more vigorously conveyed than the copper sulphide and flows out of the trough at its upper end, through the spout 15, for instance into a handling vessel 16.

In order to ensure that the copper sulphide cannot leave the upper end of the trough the intensity of the travelling field in the vicinity of the upper end of the trough is preferably so adjusted that it is too weak at this point to have a conveying effect on the copper sulphide that floats on the copper surface.

The gaseous reaction products that are evolved during the process are removed through the vent 10 in the cover 8. The slagged iron forms a layer 17 above the highly siliceous additives and is withdrawn from time to time through an opening 18 in the side of the cover 9 in a direction normal to the plane of the paper.

We claim:
1. A method of continuously producing blister copper from copper matte comprising the steps of:
introducing the copper matte into a vessel,
conveying the matte from the vessel up an ascending refractory trough by means of a travelling electromagnetic field, adding a highly siliceous material, in a first section of the trough adjoining the vessel, an admitting oxygen-containing gas into this first section and into a second following section of the trough so that the iron contained in the copper matte is oxidized and slagged in the first section of the trough and the copper sulphide, while being further conveyed up the trough, reacts with the admitted oxygen in a roasting reaction to form copper which collects on the floor of the trough, and removing the collected copper from the upper end of the trough.

2. A method according to claim 1, including the further step of adjusting the intensity of the travelling electromagnetic field in the vicinity of the upper end of the trough so that it is too weak to convey the copper sulphide floating on the surface of the liquid copper.

References Cited

UNITED STATES PATENTS

| | | | |
|---|---|---|---|
| 525,773 | 8/1894 | Vicuna | 266—11 |
| 3,459,415 | 8/1969 | Holeczy et al. | 75—72 X |
| 3,460,817 | 8/1969 | Brittingham | 75—72 X |
| 3,534,886 | 10/1970 | Von Starck | 13—33 X |
| 3,561,951 | 2/1971 | Themelis et al. | 75—74 X |

FOREIGN PATENTS

| | | | |
|---|---|---|---|
| 758,020 | 5/1967 | Canada | 75—73 |

WINSTON A. DOUGLAS, Primary Examiner

M. J. ANDREWS, Assistant Examiner